No. 727,955. PATENTED MAY 12, 1903.
W. G. JAMES.
SAFETY LOCK FOR BELT SHIPPERS.
APPLICATION FILED JUNE 30, 1902.
NO MODEL. 2 SHEETS—SHEET 1.
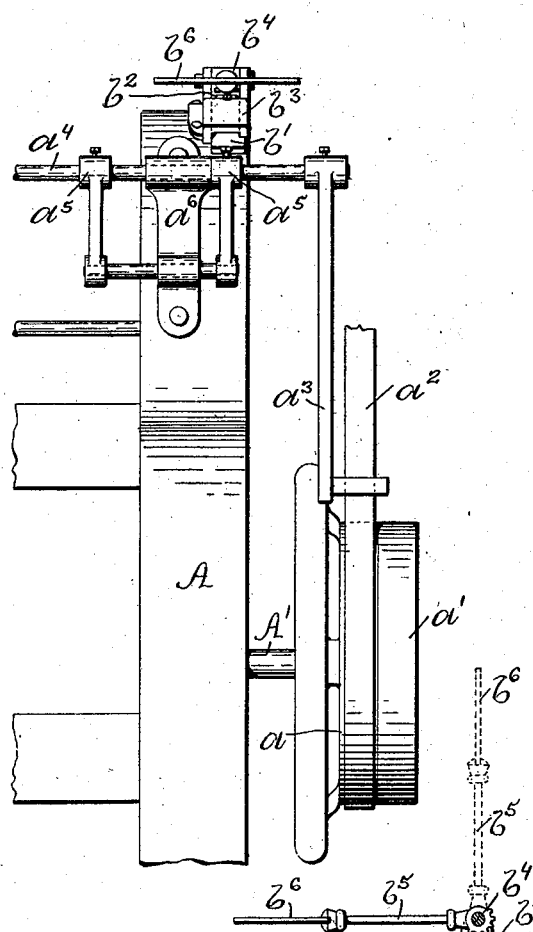
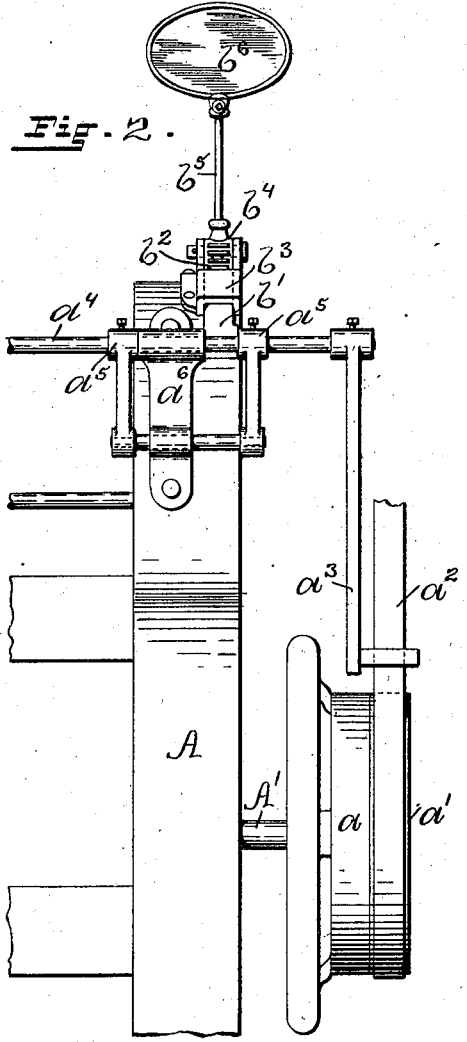
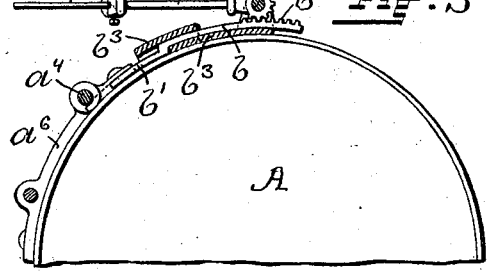
WITNESSES: INVENTOR.
Chas. H. Luther Jr. William G. James
Ada E. Hagerty By Joseph A. Willard
ATTORNEYS.

No. 727,955. PATENTED MAY 12, 1903.
W. G. JAMES.
SAFETY LOCK FOR BELT SHIPPERS.
APPLICATION FILED JUNE 30, 1902.
NO MODEL. 2 SHEETS—SHEET 2.
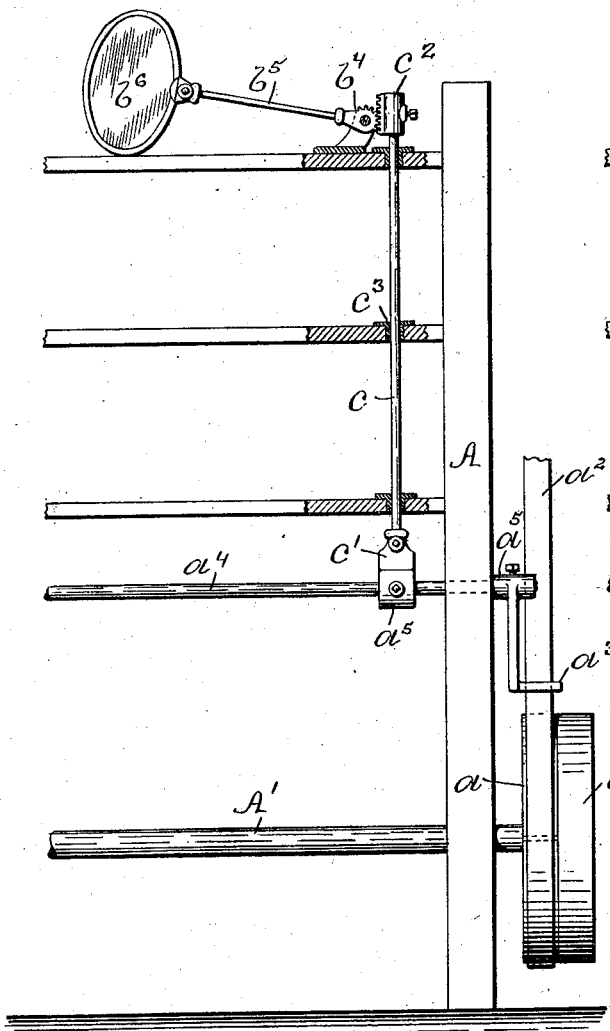
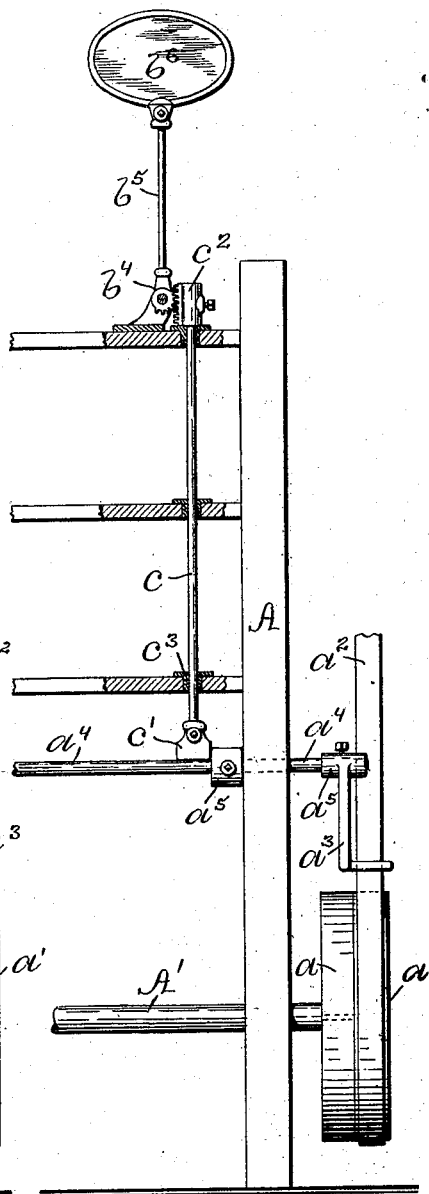
WITNESSES: INVENTOR:
Chas. H. Luther J. William G. James
Ada E. Fagerly Joseph N. Miller & Co.
ATTORNEYS No. 727,955.

Patented May 12, 1903.

UNITED STATES PATENT OFFICE.

WILLIAM G. JAMES, OF HILLSGROVE, RHODE ISLAND.

SAFETY-LOCK FOR BELT-SHIPPERS.

SPECIFICATION forming part of Letters Patent No. 727,955, dated May 12, 1903.

Application filed June 30, 1902. Serial No. 113,825. (No model.)

*To all whom it may concern:*

Be it known that I, WILLIAM G. JAMES, a citizen of the United States, residing at Hillsgrove, in the county of Kent and State of Rhode Island, have invented a new and useful Improvement in Safety-Locks for Belt-Shippers, of which the following is a specification.

In belt-driven machines it is usual to have the driving-belt supported on a loose pulley when the machine is stopped and to guide the belt by means of the belt-shipper mechanism from the loose to the tight pulley. In such machines the belt is liable to creep from the loose pulley onto the tight pulley.

In textile-machines—such as roving-frames, spinning and twisting machines, spoolers, and other machines of considerable lengths—a bar or rod usually extends the length of the machine and is connected with the belt-shipper, so that an operator may stop and start the machine at points distant from the driving-belt. Such machines require from time to time the cleaning, adjustment, or repairs of parts. Usually the machine is stopped and operators reach into or enter into the machine. It has happened and is always liable to happen that while an operator is performing his work in or about the machine the belt creeps from the loose to the tight pulley or that an operator may ship the belt from the loose to the tight pulley while another operator is attending to work within the machine or in dangerous proximity to parts of the machine.

To prevent the unauthorized starting of the machine and to give notice to all that the machine is not to be started are the objects of this invention.

To this end the invention consists in the peculiar and novel construction and arrangement, more fully set forth hereinafter, by which a positive locking device provided with a semaphore is operated, preferably, by the operator in charge of the cleaning, the adjustment, or the repairs by which the shipper is positively locked and a clear distinct notice is given to all that the machine must not be started until the particular operator in charge of the cleaning or repairs has lowered the semaphore.

Figure 1 is a side view of the end frame of a machine, showing the driving-belt controlled by the belt-shipper held in the operative position with the belt on the driving-pulley and the semaphore lowered. Fig. 2 is a side view of the same machine as shown in Fig. 1, showing the driving-belt on the loose pulley, the shipper mechanism locked, and the semaphore raised to indicate that the machine must not be started until the authorized operator has lowered the semaphore and unlocked the belt-shipper. Fig. 3 is an end view of the machine, showing the belt-shipper unlocked and the semaphore lowered in solid lines and indicating the semaphore raised in broken lines. Fig. 4 is a side view, partly in section, of a modified form of the attachment, showing the belt held by the shipper on the driving-pulley and the semaphore lowered. Fig. 5 is a side view, partly in section, of the driving end of a machine, showing the belt on the loose pulley, the shipper mechanism positively locked, and the semaphore in the raised position.

Similar marks of reference indicate corresponding parts in all the figures.

In the drawings, A indicates the end frame of a machine; A', the driving-shaft; $a$, the pulley secured to the driving-shaft; $a'$, the pulley loose on the driving-shaft, on which the belt $a^2$ is supported while the machine is stopped; $a^3$, the belt-fork by which the belt is guided from one pulley to the other and held; $a^4$, the shipper-rod to which the belt-fork is secured, and $a^5$ stops on the shipper-rod. As shown in Figs. 1 and 2, the abutment $a^6$ limits the movement of the shipper-rod and the belt-fork. As shown in Figs. 4 and 5, the end frame acts as an abutment and limits the longitudinal movement of the shipper-rod.

I am aware that belt-shippers have been operated by shipper-levers and that these shipper-levers have been held in notches or recesses, so as to hold the belt-shipper when the belt is on the driving-pulley or on the loose pulley. Spring shipper-levers have also been secured in a notch when the machine is in operation and when "knocked off" have moved the belt by spring force from the tight to the loose pulley. Such arrangements I do not claim.

By the use of my invention a separate mechanism distinct from the shipper-operating mechanism is used to securely lock the shipper and preferebly raise a signal, indicating that the machine is not to be operated.

Referring to Figs. 1, 2, and 3, the curved bar $b$, provided at one end with the locking-bolt $b'$ and at the other end with the rack $b^2$, is supported in the curved frame $b^3$, constructed to conform to the shape of the end frame A. On the frame $b^3$ is supported the pinion-arm $b^4$, from which extends the rod $b^5$, on which the semaphore $b^6$ is secured. When the machine is to be stopped for inspection, repairs, adjustment, or any other purpose, the belt being on the loose pulley the operator raises the semaphore. The teeth on the pinion-arm $b^4$, engaging with the teeth on the rack $b^2$, slide the bar $b$ and move the bolt $b'$ between the abutment $a^6$ and the stop $a^5$, secured to the shipper-rod $a^4$, and thereby securely lock the belt-shipper against movement by the usual means. The semaphore $b^6$ may be of any desired shape, but is preferably marked with words indicating danger and is painted with a conspicuous color. It is desirable to place the semaphore in an elevated and conspicuous position, so that it may be readily seen. When this is objectionable, the pinion-arm $b^4$ may be provided with a suitable handle and the semaphore omitted.

In the modified form shown in Figs. 4 and 5 the rod $c$, provided with the bolt-head $c'$ and the rack-head $c^2$, is supported in the sliding bearings $c^3 c^3$. The pinion-arm $b^4$ is pivotally supported in a suitable bracket and has the semaphore $b^6$ secured to it. When the semaphore is in the position shown in Fig. 4, the weight of the semaphore acts to support the rod $c$ and bolt-head $c'$ in the raised position, permitting the shipper-rod to be operated by the usual means. When the machine is stopped and is to be inspected or repaired, the raising of the semaphore acts to lower the rod $c$ and brings the bolt-head $c'$ alongside of the stop $a^5$ and the shipper-rod $a^4$ and locks the same between the bolt-head and the end frame A, as shown in Fig. 5, so that the shipper cannot be operated to guide the belt from the loose to the tight pulley and start the machine until the rod $c$ is raised to unlock the shipper-rod. By thus locking the belt-shipper mechanism by independent locking means accidents and injuries to operators may be avoided.

I do not wish to confine myself to the construction of the independent locking devices herein shown and described, as these may be materially modified without departing from the essential nature of my invention.

Having thus described my invention, I claim as new and desire to secure by Letters Patent—

1. A safety-lock for belt-shippers, comprising a semaphore and a locking member connected therewith, whereby the raising of the semaphore operates the locking member to lock the belt-shipper, as described.

2. In a safety-lock for belt-shippers, the combination with the belt-shipper mechanism and a stop on the same, of a sliding bolt adapted to engage with the stop, and a semaphore connected with the sliding bolt, as described.

3. In a safety-lock for belt-shippers, the combination with the loose and the tight pulleys, the belt, the belt-fork, the shipper-rod, the stops on the same, and an abutment between the stops, of a locking-bolt, a rack on the locking-bolt, a pinion-arm, and means for operating the pinion-arm to engage or disengage the locking-bolt with a stop on the shipper-rod to lock the same when the belt is on the loose pulley, as described.

4. In a safety-lock for belt-shippers, the combination with the semaphore $b^6$ and the pinion-arm $b^4$, of a locking-bar, a rack on the locking-bar engaging with the pinion-arm, and a locking member on the locking-bar adapted to engage with a stop on the shipper-rod to lock the same when the belt is on the loose pulley, as described.

5. In a safety device of the nature herein described, the combination with the means for driving the machine, the operative mechanism of the machine, and means for connecting the driving force with the operative mechanism of the machine, of a locking device and a semaphore pivotally supported and connected by a rack and pinion with the locking device which is adapted to engage with the power-connecting mechanism to lock the same and prevent the unauthorized starting of the machine, as described.

In testimony whereof I have signed my name to this specification in the presence of two subscribing witnesses.

WILLIAM G. JAMES.

Witnesses:
ADA E. HAGERTY,
J. A. MILLER, Jr.